United States Patent Office 3,083,452
Patented Apr. 2, 1963

3,083,452
FUSION-PRESSURE JOINING OF ALUMINUM MEMBERS
James R. Terrill, Natrona Heights, and James C. Richards, Arnold, Pa., assignors to Aluminum Company of America, Pittsburgh, Pa., a corporation of Pennsylvania
No Drawing. Filed May 10, 1961, Ser. No. 109,013
12 Claims. (Cl. 29—487)

This invention relates to the fusion-pressure joining of aluminum electrical conductor members to each other and it is more particularly concerned with establishing a joint between such members by the combined application of heat and pressure.

In conventional brazing processes a readily fusible metal is provided between the members to be joined and in the presence of a suitable flux the assembled members and fusible metal are heated to a temperature at which the latter melts and wets the surface of the solid members but very little, if any, fusion of the members occurs. Upon cooling, the liquid metal solidifies and establishes a joint between the members. It has been considered to be necessary to employ a flux to cleanse the surface to be brazed and to wash away any oxide residue. No pressure is applied to the joint other than that which may be needed to maintain the assembly in the desired position during the brazing operation. In this process, the bonding or filler metal must necessarily have a lower melting point than that of the abutting members, and they must retain their integrity to form the desired joint. The bonding metal, of course, remains between the joined members. Also, any flux residue should be removed in order to avoid any corrosive effect. Since no substantial pressure is applied during the joining operation, there is no intentional plastic flow of the structural members in the region of the joint.

In joining aluminum conductor members, it is sometimes imperative that the joint have the same cross sectional dimensions as one of the adjoining conductors. Such dimensional requirements often occur in the manufacture of windings for electrical equipment. Moreover, such joints must not only be strong enough to resist separation under stress, but they must have an electrical conductivity closely approximating that of the conductors. The problem of establishing a firm joint between aluminum conductors is made difficult because of the tenacious oxide film which occurs on the surface of aluminum. While this film can be removed or displaced by conventional cleaning and fluxing procedures if enough time is allowed, such operations are not acceptable where joints must be formed almost instantaneously and in a limited space.

It is therefore an object of this invention to provide a method of rapidly joining aluminum conductor members which requires substantially no surface preparation. A particular object is to provide a method of joining elongated aluminum electrical conductors wherein the joints must have a cross section substantially that of at least one of the conductors. Another object is to provide a method of joining aluminum conductor members which obviates the need of any flux.

It has now been found, contrary to expectation, that highly satisfactory joints can be made between aluminum conductor members having smooth surfaces in the region of the joint, without use of a flux, by providing a small amount of metallic copper or copper base alloy at the interface between the abutting members and rapidly heating the assembled joint to at least the temperature at which molten aluminum-copper eutectic is formed, which in the case of a binary aluminum-copper alloy is 1018° F. If a copper base alloy is used, a eutectic of lower melting point may be formed but aluminum and copper are still the major components of the eutectic and hence it is referred to as aluminum-copper eutectic. The temperature should not greatly exceed the melting point of the eutectic since it is only necessary to form the eutectic and completely consume the solid copper or copper base alloy at the interface in producing the molten alloy. This should be accomplished very rapidly, in a matter of seconds, and thus minimize any diffusion of copper into the aluminum. Either simultaneously with the generation of the eutectic, or immediately thereafter, sufficient pressure is applied to the joint to expel substantially all of the eutectic and thereby bring the fresh aluminum surfaces together to form the joint. Whatever residual eutectic and any associated intermetallic compound remains in the joint is too small to have a substantial effect upon the strength and electrical conductivity of the joint. Upon cooling, a firm strong integral joint is formed which has an electrical conductivity closely approximating that of the aluminum conductor members. The process has a distinct advantage over welding procedures since it is performed at a lower temperature and with less expensive equipment and yet the resulting joint is the full equivalent of a welded joint in respect to strength and electrical conductivity. The process is superior to soldering since no clearance must be maintained between the members to provide space for the solder and no flux or special treatment of the surface of the members is required.

At the temperature where the eutectic is formed, the aluminum becomes soft and plastic which facilitates deformation when the pressure is applied to the joint. This is particularly advantageous where a lap joint is produced and the joint must have a thickness corresponding to that of one of the members at one side of the joint. The pressure required to squeeze out the eutectic is generally sufficient to cause the desired reduction in thickness of the members in a lap joint. Where a butt joint is produced the pressure causes some bulging of the members at the joint and this should be removed if the joint is to have the same cross sectional dimensions as the adjacent portion of the joined members. The deformation and working of the metal in the region of the joint has no deleterious effect and may be beneficial to the strength of the joint. Inasmuch as both fusion and pressure are required to form the joint, we refer to our process as being a fusion-pressure method.

The compression of the members and expulsion of the liquid eutectic produces a small bulge of metal around the unconfined portions of the joint as a result of some lateral movement of the metal. Although such an enlargement can be tolerated in some cases it is usually desirable to remove it by any suitable mechanical means such as by cutting, grinding, filing or machining and reduce the width of the joint to that of one of the adjoining members. Since only a small amount of metal is to be removed, the operation can be quickly and easily accomplished.

The eutectic is produced by a reaction of the copper or copper base alloy with the aluminum. In the binary aluminum-copper system the eutectic consists of approximately 33% copper and 67% aluminum, but that proportion will change when other alloy components are present which enter into the formation of a eutectic. Either elemental copper or an alloy containing more than 50% copper may be employed but in the latter case the elements alloyed with the copper should not substantially affect the formation of a eutectic. Various brasses and bronzes can be employed, for example, in place of copper. For the sake of convenience, copper and copper base alloys will be referred to as cuprous metal.

The cuprous metal can be supplied in any convenient form such as thin sheet, such as foil, powder or even a plated deposit. Thin sheet or foil is preferred because of its ready availability and ease of application. Where a powder or a plated deposit is employed, care should be exercised to avoid the retention of substances which will interfere with formation of the eutectic or leave an undesirable residue. While some variation in the proportion of cuprous metal to the thickness of the aluminum members can be allowed it is essential in any case that enough cuprous metal be provided to form a eutectic with the aluminum over the entire face of the joint. Generally, care should be taken to avoid the presence of the cuprous metal outside of the area of fusion unless removed by the joint dressing operation. Under corrosive conditions, any unmelted cuprous metal can have an adverse effect upon the aluminum. By way of example it has been found that in forming a lap joint between aluminum members 1/4 in. in thickness, copper foil 2 to 6 mils in thickness is preferred, while for members 1/8 in. in thickness the foil should be approximately 1 to 2 mils in thickness. To form butt joints, copper foil 2 mils in thickness has been successfully used in joining aluminum rods 1/2 in. in diameter.

The aluminum conductor members may consist of the commercially pure metal, especially that of conductor grade which contains a maximum of 0.4% total impurities. However, other grades of aluminum and alloys used for conductor purposes can be joined by our process. Generally the alloys contain not more than 2% total of impurities and intentionally added elements where a high electrical conductivity is required. The term "aluminum" as used herein is intended to include both aluminum and aluminum base alloys employed for conductor purposes.

The aluminum members may be in any convenient physical form, sheet, plate, rod, bar or wire. It is also possible to join either solid or stranded cable to a bus bar by our method. For winding some electrical devices, rectangular shaped wire is preferred because of spatial limitations. Our process is particularly well adapted to forming lap joints between rectangular shaped wires.

The surfaces of that portion of the members which will form the joint do not require any protuberances or projections to engage the opposing member and for this reason the surfaces are referred to herein as being smooth. Although a flat surface is preferred, a joint can be made between smooth curved surfaces if appropriate tools are employed. Whether the surfaces are flat or curved the pressure should be applied in a direction which will cause expulsion of the molten eutectic form the interface of the abutting members. It is generally desirable to apply pressure in a direction normal to the contacting surfaces. The problem of heating and pressing the members together is more easily met, of course, where the cross section is relatively small as compared ot that of a bus bar, for example. While the surface area of the abutting members may not be of the same size where the joint is to be formed, it is generally necessary that the abutting surface of the member having the smaller area be bonded over its entire interfacial area. The joints formed between the conductors may be of the lap or butt types. It is also to be understood that while our joining process is especially well adapted to uniting two conductors, it can also be used to join three or more members in a single joint. This can be accomplished particularly well in forming a lap joint between a plurality of conductors.

To form the joint it is essential that the assembled members be quickly heated to the fusion temperature of the eutectic. Although this can be done with a torch or other heating means, if the cross section of the members is not too large, a very convenient means of heating the joint involves the use of electrically heated carbon blocks, particularly in making lap joints. The blocks can be heated independently as resistance elements or a current can be passed through both the blocks and the metal members being joined. In any case the temperature must be raised to at least the point where the aluminum-copper eutectic is formed, and preferably slightly higher, 1025° F., in order to hasten the reaction. The heating should be continued for a long enough time to permit complete dissolution of the solid cuprous metal and avoid a residue or remainder of unmelted metal at the interface between the members. The formation of the eutectic and its expulsion effects a cleansing of the abutting surfaces. To form the eutectic some aluminum is necessarily removed from the abutting faces of the members. The amount so removed is very small and in no way weakens the joint. In heating the joint, the conductor members on either side become annealed, if they were in the work hardened condition, but their strength can be increased by subsequent cold working and by heat treatment if a sufficient amount of soluble elements is present in the conductors.

It will be appreciated from what has been said about the process that a substantial portion of the conductors must remain in the joint after expulsion of the eutectic. Thus, our process is not applicable to extremely thin conductors, such as foil less than 1 mil thick, since formation of the eutectic could easily consume the foil in the region of the joint. As a practical matter our process finds its greatest utility where at least 50% of the cross section of the conductor remains after formation of the eutectic.

Either simultaneously with the heating or immediately thereafter pressure is applied to the joint to squeeze out the eutectic. Generally the pressure should be at least 200 p.s.i. and preferably at least 1000 p.s.i. The maximum pressure to be employed, however, is determined by the degree of deformation of the members that can be tolerated. Since the aluminum is relatively soft at the eutectic temperature not much pressure is needed to effect some deformation and thereby hot work the metal. Usually the pressure need not exceed 5000 p.s.i. With the application of pressure within the foregoing range substantially all of the molten eutectic is squeezed out of the joint. Whatever eutectic remains is too small to have any practical effect upon the strength of the joint. The purpose of the compression is to bring about substantial metal to metal contact between the members being joined, and not leave any residual interfacial film of eutectic composition. In making lap joints between two aluminum conductors, the total thickness can be reduced by an amount equivalent to that of at least one of the conductors at one side of the joint and thus meet dimensional requirements in an electrical winding. It is to be understood that the members being joined need not have the same cross sectional dimensions, one can be smaller than the other, but the compression reduces the thickness of the joint to that of one of the members. If three or more members are being united in a lap joint, it may not be desirable to compress the joint to a thickness equivalent to that of one of the members but only to effect a reduction sufficient to squeeze out the liquid eutectic. In such a case the joint may be thicker than any single conductor but obviously less than that of the combined thickness of all the conductors.

In the course of heating and pressing it is not necessary to use any flux or protective atmosphere. Furthermore, the surfaces of the members need not be specially prepared to remove oxide film for joining. It is only necessary to remove any dirt or other contaminant.

The following examples will serve to illustrate the invention and some of its advantages, where copper and brass foil inserts were employed in making lap joints between two aluminum conductor members in the form of strip or wire. The aluminum was of conductor grade containing not more than 0.4% impurities. The ends of the members were assembled in overlap relationship of ½ in. with the foil insert between them and the assembly placed between carbon blocks in conventional carbon block brazing apparatus. An A.C. current of 500 to 600 amperes at a potential of 7 to 9 volts was passed through the blocks and metal members while a clamping load of 240 to 300 lbs. was applied to the blocks which produced a pressure on the joint of 1200 to 2200 p.s.i. The heating and pressing was accomplished in 7 to 15 seconds, whereupon the current was shut off, the joint allowed to cool for a few seconds, and then removed from the apparatus. The lap joints were reduced in thickness to that of the abutting members and trimmed to the width of those members. The joints were subjected to a tensile test with the results given in Table I below.

TABLE I

*Strength of Joints*

| Nominal Cross Section of Conductor | Metal Insert | Thickness of Metal Insert, mils | Breaking Load, lbs. | Calculated Stress, p.s.i. | Location of Break |
|---|---|---|---|---|---|
| 0.114″ x 5/16″ | Cu | 1.5 | 420 | 11,800 | Outside of Joint. |
| ¼″ x 7/32″ | Cu | 5 | 650 | 11,800 | Do. |
| ¼″ x 3/8″ | Cu | 5 | 960 | 10,200 | Do. |
| ¼″ x ¼″ | Brass | 5 | 625 | 10,100 | Do. |

The typical tensile strength of conductor grade aluminum in the annealed temper is 12,000 p.s.i. and hence it will be seen that the strength of the joints was close to that of the parent metal. A ridge or bead of expelled eutectic occurred at the lateral edges of the joint but metallographic examination of a cross section at the interface revealed only traces of the eutectic. The metal of one conductor merged into that of the other, no line of separation being seen.

Electrical conductivity tests that were made on a number of joints of the conductors of the first item in Table I revealed that they had values of 99 to 100% that of the conductors. It is therefore evident that our process can produce joints which have substantially the same conductivity as the parent metal which is an obvious advantage.

Having thus described our invention and certain embodiments thereof, we claim:

1. The method of fusion-pressure joining aluminum electrical conductor members comprising providing a smooth surface on the members at the interface where the members are to be joined, providing a relatively small amount of cuprous metal at the interface, assembling the members in joint relationship, rapidly heating the joint to a temperature at least high enough to produce aluminum-copper eutectic on the surface of said members but leaving a substantial portion of the members in the solid state, applying sufficient pressure to the joint to expel substantially all of the liquid eutectic from the interface of the joint and deform the members at the interface and thereafter cooling the joint.

2. The method according to claim 1 wherein the cuprous metal consists of copper.

3. The method according to claim 1 wherein the cuprous metal is in the form of foil.

4. The method according to claim 1 wherein the joint is rapidly heated to a temperature of at least 1025° F.

5. The method according to claim 1 wherein the pressure applied to the joint is between 200 and 5000 p.s.i.

6. The method according to claim 1 wherein the members to be joined have flat smooth surfaces at their interface.

7. The method of fusion-pressure joining aluminum electrical conductor members comprising providing a flat smooth surface on the members at the interface where the members are to be joined, positioning a thin sheet of cuprous metal between the members where the joint is to be made, rapidly heating said assembled joint between electrically heated carbon blocks to a temperature at least high enough to produce aluminum-copper eutectic on the surface of said members but leaving a substantial portion of the members in the solid state, applying a pressure to said blocks simultaneously with the heating thereof and the metal therebetween, said pressure being sufficient to expel substantially all of the molten eutectic from the interface of the joint and deform the members at the interface, removing the joined members from the heating device and cooling them.

8. The method according to claim 7 wherein the cuprous metal consists of copper.

9. The method of fusion-pressure joining aluminum electrical conductor members comprising providing a smooth surface on the members at the interface where the joint is to be formed, providing a relatively small amount of cuprous metal at the interface where members are to be joined, positioning the members in overlapping relationship, rapidly heating said lap joint assembly to a temperature at least high enough to produce aluminum-copper eutectic on the surface of said members but leaving a substantial portion of the members in the solid state, applying sufficient pressure to the joint to expel substantially all of the eutectic from the interface of the joint and reduce the thickness of the joint by an amount equivalent to that of one of the adjoining members and thereafter cooling the joint.

10. The method according to claim 9 wherein the cuprous metal consists of copper foil.

11. The method according to claim 9 wherein the pressure applied to the joint is between 200 and 5000 p.s.i.

12. The method according to claim 9 wherein the members being joined are in the form of rectangular shaped wire.

No references cited.